Oct. 22, 1968   R. R. EMBREE   3,407,336
ELECTRONIC GROUND-ABSENCE DETECTOR AND PROTECTIVE DEVICE
Filed Aug. 11, 1966

INVENTOR
RAY R. EMBREE

BY Herman L. Gordon
ATTORNEY

United States Patent Office 3,407,336
Patented Oct. 22, 1968

3,407,336
ELECTRONIC GROUND-ABSENCE DETECTOR AND PROTECTIVE DEVICE
Ray R. Embree, Seattle, Wash., assignor to Physio-Control Corporation, Seattle, Wash., a corporation of Delaware
Filed Aug. 11, 1966, Ser. No. 571,849
10 Claims. (Cl. 317—17)

ABSTRACT OF THE DISCLOSURE

Device for detecting absence of a ground connection in a proposed supply source. The device has a three-prong plug, with a rectifier bridge connected across the two line prongs and a ground detection circuit branch including a relay connected between one output terminal of the bridge and the ground prong. An indicator lamp is connected across the line prongs through normally closed contacts of the relay, opened responsive to energization of the relay by current flow in the ground detection circuit branch. The device also has load terminals connected to the line prongs through normally open contacts of the relay.

---

This invention relates to electrical safety devices, and more particularly to devices for detecting the absence of ground connections in electrical outlets and for insuring that an electrical appliance or instrument plugged into an outlet is properly grounded.

A main object of the invention is to provide a novel and improved ground-absence detector which is simple in construction, which is easy to attach, which provides a positive indication of the absence of a ground connection in a supply outlet receptacle, and which does not allow power to be supplied to an associated load device unless the supply outlet receptacle includes a proper ground connection.

A further object of the invention is to provide an improved ground-absence detection and protective device which may either be employed as an accessory adapted to be connected between a supply socket and an electrically operated appliance or instrument, or which may be built into the appliance or instrument, the device being inexpensive to manufacture, being reliable in operation, and greatly reducing electrical hazards in using the appliance or instrument by insuring that the supply socket is properly grounded before allowing the appliance or instrument to be energized, as well as providing a clear and positive indication of the absence of a proper ground.

A still further object of the invention is to provide an improved ground-absence detection and protective apparatus of the type employing a rectifier bridge circuit with interconnections including transistor amplifiers arranged so that when a proper ground is not present at a supply socket, or if an improper plug is employed with a device to be energized, the apparatus provides a warning signal and prevents transmission of power to the device, and wherein when a proper ground is present at the supply socket and a proper grounding plug is employed with the device to be energized, the apparatus reacts to deenergize the warning signal and to allow power to be transmitted to said device.

Further objects and advantages of the invention will become apparent from the following description and claims, and from the accompanying drawings, wherein:

Figure 1:
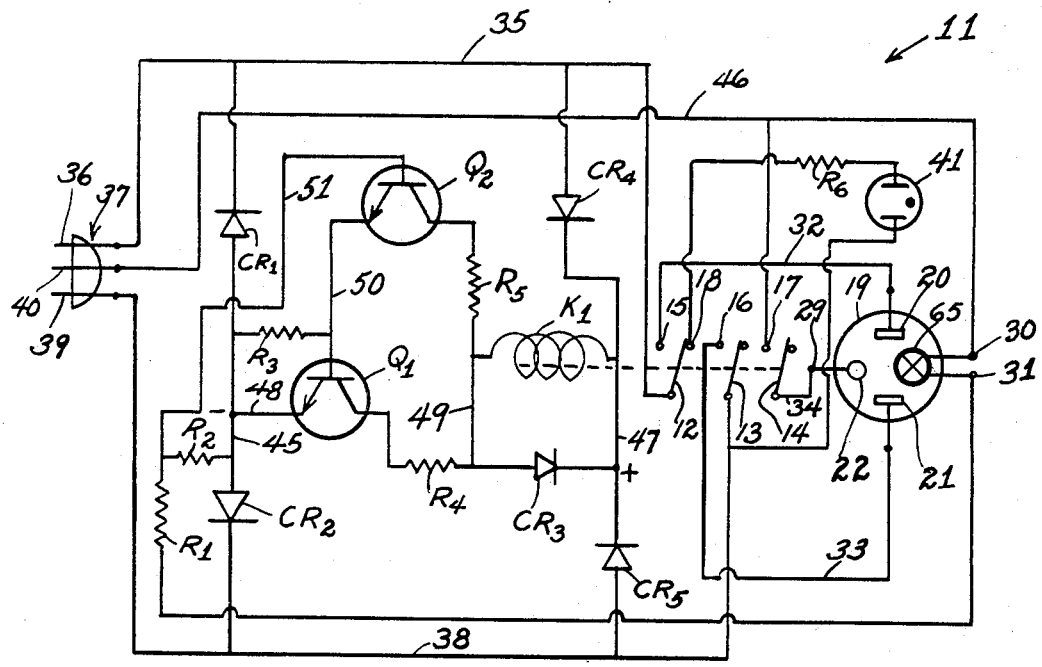
FIGURE 1 is a schematic wiring diagram of an electrical safety device constructed in accordance with the present invention.

Referring to the drawings, 11 generally designates a ground-absence detector and protective device adapted to be employed as an accessory connected between a wall socket and a power supply plug leading to an electrical instrument or appliance. The wall socket (not shown) is of the type having a pair of female supply line outlet terminals and a female ground terminal, which should be connected to one of the line outlet terminals in the installation. Thus, in the normal installation, one of the single phase supply lines leading to the line outlet terminals is grounded. However, it frequently happens that the ground connection between the socket ground terminal and one of the socket line outlet terminals is absent, creating a dangerous condition for users of appliances or instruments plugged into the socket.

A prime purpose of the apparatus 11 is to detect the absence of the ground connection of the supply socket and to prevent energization of an appliance or instrument from said socket when the ground connection is not present.

The apparatus 11 comprises a relay $K_1$ having the poles 12, 13 and 14, the relay being provided with stationary contacts 15, 16 and 17 engageable respectively by said poles when the relay is energized. Under normal conditions, namely, when the relay is deenergized, pole 12 engages a stationary contact 18 and the remaining poles engage similar stationary contacts.

Figure 2:
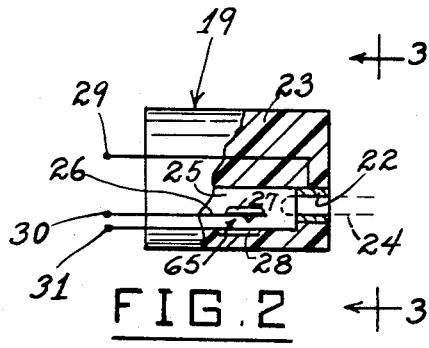
FIGURE 2 is a schematic elevational view, partly in cross-section, of a load connection socket employed with the safety device of FIGURE 1 to insure the use of a proper three-prong plug with the load device connected to a supply socket through the safety device.
Figure 3:
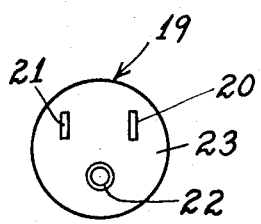
FIGURE 3 is an elevational view taken substantially on the line 3—3 of FIGURE 2.

Designated schematically at 19 is a female socket adapted to receive a conventional three prong grounding plug leading to an appliance or instrument to be energized. The socket 19 has the female line terminals 20 and 21 and the female ground prong terminal 22. As shown in FIGURES 2 and 3, the socket 19 comprises a main body 23 provided at one end with apertures leading to the line terminals 20 and 21, and with another aperture for the ground prong 24 of the appliance plug. The ground terminal 22 may comprise a metal sleeve secured in this last-named aperture for conductively engaging the plug ground prong.

A cavity 25 is provided in body 23, and mounted therein parallel to the axis of sleeve 22 is a resilient contact arm 26 provided at its free end with a flat abutment plate element 27 of insulating material having a bevelled abutment edge located in the path of the ground prong 24 and being engageable thereby when the ground prong is inserted in the sleeve 22. When the prong 24 is substantially fully inserted, the plate element 27 is deflected downwardly, as viewed in FIGURE 2, flexing the contact arm 26 into engagement with a subjacent metal contact plate 28 fixedly secured in the bottom wall of recess 25. Thus, the elements 26–28 define a normally open switch, designated generally at 65, said switch being closed responsive to the presence of a ground prong 24 on the plug inserted in the socket 19.

Sleeve 22 is connected to a socket connection terminal 29, contact arm 26 is connected to a socket connection terminal 30, and contact plate 28 is connected to a socket connection terminal 31. The female line prong-receiving elements 20 and 21 are similarly provided with socket connection terminals, not shown.

The stationary relay contact 15 is connected to terminal element 20 by a wire 32 and the stationary relay contact 16 is connected to terminal element 21 by a wire 33. Relay pole 14 is connected to socket terminal 29 by a wire 34. Relay pole 12 is connected by a wire 35 to one of the line prongs 36 of a conventional three prong grounding appliance plug 37 adapted to be engaged in a supply socket. Relay pole 13 is connected by a wire 38 to the opposite line prong 39 of plug 37.

Relay contact 17 is connected by a wire 46 to the ground prong 40 of plug 37.

Connected in series between relay contact 18 and wire 38 are a current limiting resistor $R_6$ and a neon lamp 41. In the absence of a proper ground connection or the use of a proper grounding plug in the socket 19, as will be presently explained, lamp 41 will be energized by a circuit comprising line prong 36, wire 35, relay pole 12, contact 18, resistor $R_6$, the lamp 41, wire 38, and line prong 39.

Connected in opposition across line wires 35 and 38 are a pair of diodes $CR_1$ and $CR_2$, poled so that their common junction wire 45 is negative. Also connected in opposition across said line wires 35 and 38 are another pair of diodes $CR_4$ and $CR_5$, poled so that their common junction wire 47 is positive. Thus, the diodes $CR_1$, $CR_2$, $CR_4$ and $CR_5$ define a rectifier bridge having the respective positive and negative output terminal conductors 47 and 45.

A first transistor $Q_1$ has its emitter connected by a wire 48 to the negative junction wire 45. The collector of transistor $Q_1$ is connected through a resistor $R_4$ and a wire 49 to one terminal of the winding of relay $K_1$. The remaining terminal of said winding is connected to the positive junction wire 47. The base of transistor $Q_1$ is connected by a wire 50 to the emitter of a second transistor $Q_2$. The collector of transistor $Q_2$ is connected through a resistor $R_5$ to wire 49. The base of transistor $Q_2$ is connected by a wire 51 and a resistor $R_2$ to the negative junction wire 45. A resistor $R_3$ is connected across wires 45 and 50.

The terminal 31 of the above-described switch 65 is connected to wire 51 through a resistor $R_1$. The remaining terminal 30 of said switch 65 is connected to ground wire 46.

A diode $CR_3$ is connected across wires 49 and 47, said diode $CR_3$ acting to pass the inductive current of the winding of relay $K_1$ to maintain the current in said winding above the dropout current value thereof during alternate half cycles when the relay is energized, as will be presently described.

The elements connected in series with the winding of relay $K_1$ between the bridge output terminal wires 47 and 45 define a controlled impedance consisting of the transistors $Q_1$ and $Q_2$ together with their biasing and stabilizing resistors $R_1$ to $R_5$.

In operation, let it be assumed that the supply socket into which plug 37 is inserted is properly grounded, namely, that the internal connections of the supply socket system are such as to electrically connect prong 40 to either prong 36 or 39. Under these conditions, lamp 41 will be energized until switch 65 is closed by the insertion of a proper grounding three-prong plug into the socket 19. Then, with these two conditions met, a small current will flow from wire 46 (which is electrically connected to one of the line wires 35 or 38) through switch 65, resistors $R_1$, $R_2$ and either diode $CR_1$ or $CR_2$ to the other line wire, placing conduction bias voltage on the base of transistor $Q_2$, since wire 51 connects said base to the junction of resistors $R_1$ and $R_2$.

Due to the current gain of transistor $Q_2$, a larger current then flows to the collector of transistor $Q_2$ through the winding of relay $K_1$ and either diode $CR_4$ or $CR_5$, and thence into the base of transistor $Q_1$ and out through either diode $CR_1$ or $CR_2$.

The increased current to the base of transistor $Q_1$ causes the collector current thereof to increase, because of the current gain of said transistor, to a value sufficient to operate relay $K_1$ and to cause poles 12, 13 and 14 to swing into engagement with contacts 15, 16 and 17, respectively. This connects socket terminals 20 and 21 to line wires 35 and 38, as above described. The relay winding is energized through a circuit comprising one of the line wires 35 or 38, diode $CR_4$ or $CR_5$, the winding of relay $K_1$, resistor $R_4$, the collector-emitter current path of transistor $Q_1$, either diode $CR_1$ or $CR_2$, and the other line wire.

As above mentioned, the diode $CR_3$ acts to pass the inductive current of the coil of relay $K_1$ to maintain the current in the coil above the dropout value during alternate half cycles.

The gain of the amplifier portion of the circuit is sufficient to allow the limiting of the current in resistor $R_1$ to a value below the normal threshold of sensation to electric currents by a human.

Since a symmetrical bridge rectifier circuit is employed, it makes no difference as to which side of the input power line is grounded when plug 37 is inserted in the supply receptacle. When the ground side is reversed at the plug 37, the alternate rectifiers of the bridge are used.

In the event that no third wire connection is made to the power line at the ground terminal of plug 37, such as when a two-prong adaptor is used between plug 37 and the supply receptacle, relay $K_1$ will not pull in and will not connect the line wires 35, 38 to terminals 20, 21. In such an event, the indicator lamp 41 will become energized, indicating the lack of a ground at plug 37 or the absence of a proper three-contact plug inserted in socket 19.

It will be noted that the cascaded amplifier defined by transistors $Q_2$ and $Q_1$ responds to cause energization of relay $K_1$ when a definite signal or bias voltage appears on the base of transistor $Q_2$. This signal or bias voltage is taken at the junction of resistors $R_1$, $R_2$. In order to provide this signal or bias voltage, switch 65 must be closed and wire 46 must be connected to one of the line wires (to establish a current in the circuit branch containing resistors $R_1$, $R_2$).

The socket 19 may be omitted where the device is installed as an integral part of a single unit with fixed load, such as an appliance or instrument.

Furthermore, the device may be employed merely to sound an alarm or energize a lamp as a warning that a ground is not connected to one of the supply lines.

The circuitry employed need not be limited to the use of transistors, since many other types of controlled impedances may be used in place thereof, such as silicon-controlled rectifiers, silicon-controlled switches, magnetic amplifiers, Triacs, or vacuum tubes. It is also possible, within the scope of the present invention, to replace the relay itself with silicon-controlled rectifiers, Triacs, or the like.

While a specific embodiment of an improved ground absence detector and protective device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A ground-absence detection and protective device comprising a three-prong plug engageable in a three-terminal current supply socket of the type having a female ground terminal intended to be internally connected to one of the socket current supply conductors, said plug having a pair of line prongs and a ground prong, a rectifier bridge connected across said pair of line prongs, said bridge having two output terminals of opposite polarity, a ground connection detection circuit branch connected between one of said output terminals and said ground prong, whereby a ground-detection current will flow in said circuit branch responsive to the presence of an internal connection between said female ground terminal and one of said socket current supply conductors when the plug is inserted in the supply socket, an electrical indicator, circuit means normally connecting said indicator across said line prongs, and means opening said last-named circuit means responsive to the flow of said ground-detection current in said ground connection detection circuit branch.

2. The detection and protective device of claim 1, and a pair of load conductors, and means connecting said load conductors to said line prongs responsive to said flow of ground-detection current in said ground detection circuit branch.

3. The detection and protective device of claim 1, and wherein the means opening the last-named circuit means comprises a normally deenergized relay having normally closed contacts included in said last-named circuit means, and means to energize said relay responsive to the flow of said ground-detection current in said ground connection detection circuit branch.

4. The detection and protective device of claim 3, and wherein the means to energize the relay comprises controlled impedance means, circuit means connecting the relay in series with said controlled impedance means across said output terminals, and means to substantially reduce the impedance value of said controlled impedance means responsive to said flow of ground-detection current in said ground-detection circuit branch.

5. The detection and protective device of claim 4, and wherein said ground-detection circuit branch comprises at least two series-connected impedances, said controlled impedance means being connected to the junction of said series-connected impedances.

6. The detection and protective device of claim 4, and wherein said controlled impedance means comprises an amplifier, said last-named circuit means comprising the load circuit of said amplifier, the input of said amplifier being connected to a point on said ground-detection circuit branch.

7. The detection and protective device of claim 6, and wherein said amplifier comprises two successive transistors connected in cascade relationship, the base of the first transistor being connected to said point on the ground-detection branch, and said load circuit including the emitter-collector current path of the second transistor.

8. The detection and protective device of claim 2, and an outlet socket having a pair of line outlet terminals and a ground prong-receiving terminal, circuit means connecting said line outlet terminals to said load conductors, means to connect said ground prong-receiving terminal to said ground prong, normally open switch means connected in said ground-detection circuit branch, and means closing said switch means only responsive to the presence of a prong in said ground prong-receiving terminal.

9. The detection and protective device of claim 1, and an outlet socket having a pair of line outlet terminals and a ground prong-receiving terminal, a pair of load conductors connected to said line prongs, a normally deenergized relay having normally closed contacts included in said last-named circuit means and having normally open contact means, further circuit means including said normally open contact means connecting the load conductors to said line outlet terminals, and means to energize said relay responsive to the flow of said ground-detection current in said ground connection detection circuit branch.

10. The detection and protective device of claim 9, and normally open switch means mounted in said outlet socket, said switch means being included in said ground-detection circuit branch, and means closing said switch means only responsive to the presence of a prong in said ground prong-receiving terminal.

References Cited

UNITED STATES PATENTS 3,072,827   1/1963   Benish _____ 317—18

FOREIGN PATENTS 538,296   6/1955   Belgium.
679,789   9/1952   Great Britain.

JOHN F. COUCH, *Primary Examiner.*

R. V. LUPO, *Assistant Examiner.*